United States Patent

Iino et al.

[11] Patent Number: 5,904,784
[45] Date of Patent: May 18, 1999

[54] COMPOSITION AND METHOD FOR TREATING THE SURFACE OF ALUMINIFEROUS METALS

[75] Inventors: Yasuo Iino; Masahiro Motozawa; Toshihiro Ikeda, all of Kanagawa-Ken, Japan

[73] Assignee: Henkel Corporation, Gulph Mills, Pa.

[21] Appl. No.: 08/750,261

[22] PCT Filed: Jun. 2, 1995

[86] PCT No.: PCT/US95/06710

§ 371 Date: Dec. 3, 1996

§ 102(e) Date: Dec. 3, 1996

[87] PCT Pub. No.: WO95/33869

PCT Pub. Date: Dec. 14, 1995

[30] Foreign Application Priority Data

Jun. 3, 1994 [JP] Japan .................................. 6-122603

[51] Int. Cl.$^6$ .................................................. C23C 22/48
[52] U.S. Cl. ...................... 148/247; 148/253; 148/255; 148/260; 148/275
[58] Field of Search ................................. 148/247, 255, 148/260, 275, 253

[56] References Cited

U.S. PATENT DOCUMENTS 5,030,323  7/1991  Awad ........................................ 148/253
5,064,500  11/1991  Awad ........................................ 148/253

FOREIGN PATENT DOCUMENTS 52-131937  11/1977  Japan .
57-039314  3/1982  Japan .
58-030344  2/1983  Japan .
5-239434  9/1993  Japan .

*Primary Examiner*—David A. Simmons
*Assistant Examiner*—Robert R. Koehler
*Attorney, Agent, or Firm*—Wayne C. Jaeschke; Norvell E. Wisdom, Jr.; Lance G. Johnson

[57] ABSTRACT

Treatment of aluminiferous metal surfaces with an aqueous liquid composition which has a pH value in the range from 1.8 to 4.0 and comprises (A) from 0.01 to 1.0 g/L of phosphate ions, (B) from 0.01 to 0.5 g/L, measured as its total stoichiometric equivalent as metal, of water-soluble zirconium and titanium compounds, (C) from 0.01 to 2-0 g/L, measured as fluorine, of simple and/or complex fluoride anions; and (D) from 0.01 to 2.0 g/L of water-soluble polyamides that contain at least one tertiary amino or polyoxyalkylene moiety forms a highly corrosion-resistant, strongly paint-adherent, and low friction conversion coating on the metal surface.

13 Claims, 1 Drawing Sheet

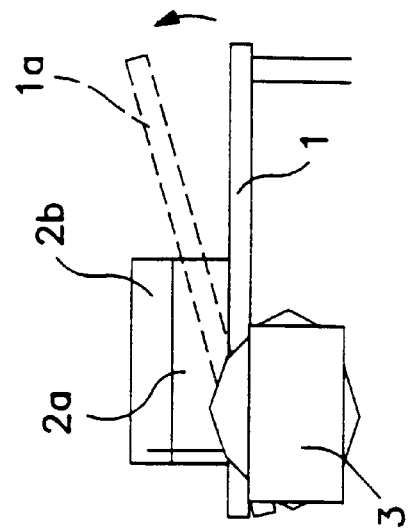
FIG. IC
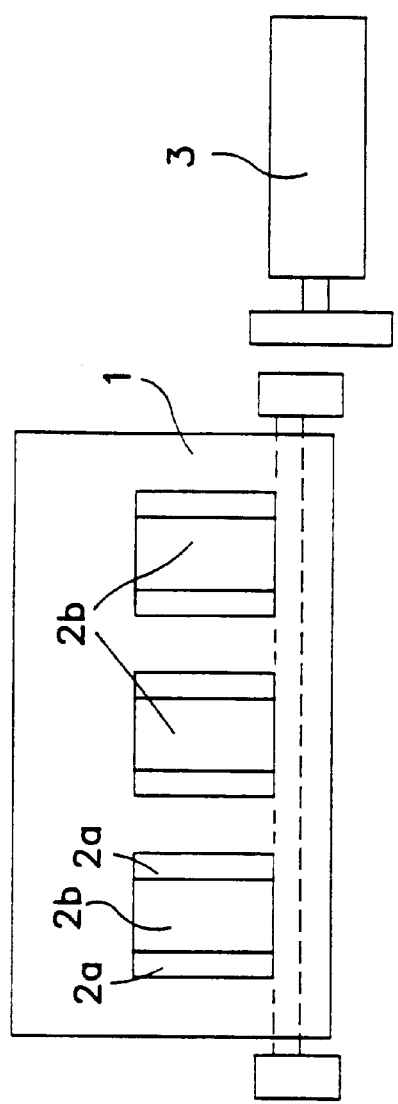
FIG. IA
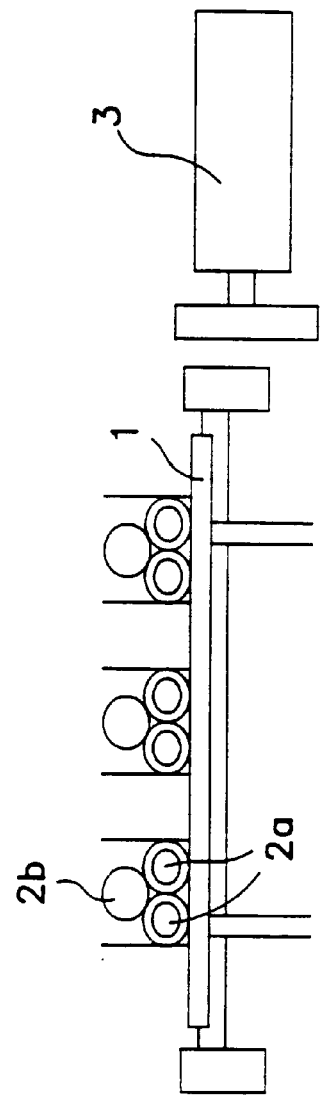
FIG. IB

COMPOSITION AND METHOD FOR TREATING THE SURFACE OF ALUMINIFEROUS METALS

FIELD OF THE INVENTION

This invention relates to a liquid composition, which may be either a working composition suitable for direct use in treating metal (and if so may also be called a "bath" herein below even if not used by immersion) or a concentrate composition suitable for diluting with water and/or mixing with one or more other concentrate compositions to form a working composition, and to a method for treating the surface of aluminiferous metals, which are defined for this purpose to be aluminum and its alloys that contain at least 45% by weight of aluminum. More particularly, this invention relates to a composition and/or method, for treating the surface of aluminiferous metals, that imparts thereto an excellent resistance to blackening by boiling water, an excellent paint adherence, and an excellent lubricity, and which are therefore useful, for example, for creating surface conditions that are highly adapted for aluminum can fabrication.

DESCRIPTION OF RELATED ART

The manufacture of drawn-and-ironed (the phrase "drawn-and-ironed" and any grammatical variations thereof such as "drawing-and-ironing", "draw-and-iron", or the like being hereinafter usually abbreviated "DI") aluminum cans typically performed by a DI process, followed by surface cleaning with an acidic cleaner in order to remove soil commonly called "smut" in the art, the smut being composed of aluminum microparticles, lubricant (coolant), metal soap, and the like, and then by a phosphate conversion coating treatment on the surface, with the goal of improving the corrosion resistance and paint adherence. These conversion coating treatments may be broadly classified into chromate treatments, which produce chromium phosphate coatings, and non-chromate treatments, which usually contain zirconium compounds such as fluozirconic acid and salts thereof and produce composite films of zirconium oxide, zirconium phosphate, and the like.

Cleaning processes using non-chromate conversion reagents have recently come to account for approximately 80% of the cleaning lines in Japan as a consequence of environmental protection issues. After the conversion treatment, conversion-coated aluminum cans are generally subjected to a thorough rinse in a washer and drying in a water-draining oven, and, upon exiting the oven, are transported to a printing or painting process. Upon reaching the printing or painting process, the cans, which during previous process steps are typically running in about five to thirty lines, are passed through a single filer to form a single line for transfer to a special-purpose conveyor. Can transport is impeded at this point by the contact occurring between the cans and guides and between individual cans. The prevailing view is that the reason for this is the relatively high coefficient of static friction of cleaned and conversion-treated aluminum cans. The recent increases in transport rates associated with increases in can manufacturing output have caused a proliferation in the sources of this problem, and the resulting reduction in productivity has become an increasingly serious problem. This has created a strong desire to reduce the coefficient of static friction of the external surfaces of aluminum cans without impairing the corrosion resistance.

For example, Japanese Patent Application Laid Open [Kokai or Unexamined] Number Sho 64-85292 [85,292/1989] teaches a method for imparting lubricity to aluminum cans and thereby raising the can transport efficiency. In this method, a water-soluble organophosphate ester, water-soluble derivative of a saturated fatty acid, or the like is sprayed onto the can surface between the final deionized water rinse in the can washer line and the draining-drying process. This spraying serves to form a lubricating organic film on the can surface.

However, when a cleaning unit is employed that recycles the deionized water from the final rinse using an active carbon adsorption treatment, components of the coating end up being adsorbed by the active carbon. This has negative economic consequences because it accelerates deterioration of the active carbon and increases chemical consumption. In addition, when the shape of the workpiece is such that the bath tends to drain from one part of the workpiece surface into a pool over another part of the surface, the concentration of the residual bath in the pool zones during drying causes such problems as uneven blotches and paint film delamination.

Japanese Patent Application Laid Open [Kokai or Unexamined] Number Hei 5-239434 [239,434/1993] describes a method for forming a highly lubricating organic-inorganic composite coating. In this method, in the conversion coating process in the aforementioned can washer line the aluminiferous metal substrate is sprayed with or immersed in an acidic aqueous solution (pH adjusted to 2 to 5) that contains metal ions (Fe, Zr, Sn, Al, and/or Ce) and/or water-soluble organophosphate esters or water-soluble derivatives of a saturated fatty acid. Nevertheless, the aluminiferous metal afforded by this method still does not exhibit an acceptable resistance to blackening.

In sum, then, there is not yet available at the present time a composition and/or method for treating the surface of aluminiferous metals that is able to simultaneously furnish an excellent corrosion resistance, excellent paint adherence, and excellent lubricity under all or almost all conditions of practical use of the treated aluminiferous metal substrates.

DESCRIPTION OF THE INVENTION

Problems to Be Solved by the Invention

The present invention seeks to solve the problems described above for the related art. In specific terms, the present invention introduces a novel surface-treatment composition and/or method that is able to form a very corrosion-resistant, strongly paint-adherent, and highly lubricating conversion coating on the surface of aluminiferous metals.

SUMMARY OF THE INVENTION

It was discovered that very corrosion-resistant, strongly paint-adherent, and highly lubricating coatings can be formed on the surface of aluminiferous metals through the use of a water-based treatment bath containing particular quantities of phosphate ion, fluoride, water-soluble polyamide, and at least one selection from water-soluble zirconium and titanium compounds.

A composition according to the present invention, which may be either a working composition directly suitable for treating the surface of aluminiferous metals or a concentrate for making a working composition by dilution with water and/or mixing with other concentrates, comprises, preferably consists essentially of, or more preferably consists of, water and:

(A) phosphate ions;
(B) a component selected from water-soluble zirconium and titanium compounds, in an amount such that the ratio by weight of the stoichiometric equivalent as total zirconium and titanium metal to the weight of phosphate ions in the composition is from 0.01 to 50;

(C) a component selected from simple and complex fluoride anions, in an amount such that the ratio by weight of the stoichiometric equivalent as total fluorine to the weight of phosphate ions in the composition is from 0.01 to 200; and (D) a component selected from polyamides that include moieties selected from the group consisting of tertiary amino moieties and polyoxyalkylene moieties, in an amount such that the ratio by weight of the polyamides to the weight of phosphate ions in the composition is from 0.01 to 200.

A bath according to the present invention for treating the surface of aluminiferous metals is an aqueous solution, with a pH value in the range from 1.8 to 4.0, which comprises, preferably consists essentially of, or more preferably consists of water and:

(A) from 0.01 to 1.0 grams per liter (hereinafter usually abbreviated "g/L") of phosphate ions, (B) from 0.01 to 0.5 g/L, measured as its total stoichiometric equivalent as zirconium and/or titanium metal, of a component selected from the group consisting of water-soluble zirconium and titanium compounds;

(C) from 0.01 to 2.0 g/L, measured as its stoichiometric equivalent as fluorine, of a component selected from the group consisting of simple and complex fluoride anions; and (D) from 0.01 to 2.0 g/L of a component selected from the group consisting of water-soluble polyamide molecules, each of which contains at least one moiety selected from the group consisting of tertiary amine moieties and polyoxyalkylene moieties.

Finally, a method according to the present invention for treating a surface of aluminiferous metals characteristically comprises the formation of a conversion coating on a surface of aluminiferous metal by contacting the metal surface with a surface-treatment bath according to the invention as described above, in order to form thereon a layer including material incorporated from the surface-treatment bath and, optionally but preferably, thereafter rinsing with water and drying by heating.

BRIEF DESCRIPTION OF THE DRAWINGS

FIG. 1 (A) is a top view showing cans to be tested for coefficient of friction in place on a tiltable plate in testing apparatus. FIGS. 1 (B) and 1 (C) are front and side views respectively of the same apparatus, with cans in place thereon, as is shown in FIG. 1 (A).

DESCRIPTION OF PREFERRED EMBODIMENTS

Aluminiferous metals which may be subjected to the present invention encompass aluminum and aluminum alloys, wherein said aluminum alloys encompass aluminum/manganese alloys, aluminum/magnesium alloys, aluminum/copper alloys, and the like. The shape and dimensions of the aluminiferous metal are not critical; for example, sheet, tubing, wire, and the like, may all be treated.

A concentrate composition according to the present invention is a waterbased mixture—and preferably an aqueous solution—containing the necessary ingredients already described above. The total solids concentration in such as concentrate composition is not critical, but in general preferably does not exceed 10 weight % and more preferably is 0.01 to 1 weight %.

The phosphate ions source can be, for example, phosphoric acid ($H_3PO_4$), sodium phosphate ($Na_3PO_4$), ammonium phosphate (($NH_4$)$_3PO_4$), and/or the like. The phosphate ions concentration preferably ranges from 0.01 to 1.0 g/L and particularly preferably ranges from 0.02 to 0.40 g/L. The reactivity, with a surface of aluminiferous metal, of a bath otherwise according to the invention but with phosphate ions concentrations below 0.01 g/L generally is inadequate, so that an acceptable coating will not be produced. Since no additional improvements in film-forming capacity are obtained at phosphate ions concentrations beyond 1.0 g/L, the corresponding increase in the cost of the treatment bath is economically unjustified.

The water-soluble zirconium compounds and water-soluble titanium compounds can be selected, for example, from oxides such as zirconium oxide and titanium oxide, hydroxides such as zirconium hydroxide and titanium hydroxide, fluorides such as zirconium fluoride and titanium fluoride, and nitrates such as zirconium nitrate and titanium nitrate; however, other water-soluble compounds of zirconium and titanium may be used. The concentration of this component preferably ranges from 0.01 to 0.5 g/L, measured as the stoichiometric equivalent as zirconium and/or titanium metal, and particularly preferably ranges from 0.02 to 0.08 g/L as metal. The film-forming capacity of the surface-treatment bath is usually inadequate at concentrations below 0.01 g/L. On the other hand, no additional improvements in film-forming capacity are normally obtained at concentrations beyond 2.0 g/L, and the corresponding increase in the cost of the treatment bath is therefore economically unjustified.

The fluoride component can be obtained from acids such as hydrofluoric acid (HF), fluozirconic acid ($H_2ZrF_6$), fluotitanic acid ($H_2TiF_6$), and the like, and from the salts of these acids (for example, ammonium salts, sodium salts, and the like), but no specific limitations apply to the particular fluoride selected. (If fluozirconic and/or fluotitanic acids and/or salts thereof are used, these materials are sources of both the necessary metal content, as described in the paragraph immediately preceding this one, and the fluoride.) The fluoride concentration in the surface-treatment bath preferably ranges from 0.03 to 1.0 g/L, measured as its stoichiometric equivalent as fluorine, and particularly preferably ranges from 0.03 to 0.6 g/L as fluorine. The poor reactivity occurring at concentrations below 0.03 g/L generally prevents the formation of an acceptable coating. At the other end of the range, concentrations above 1 g/L are undesirable due to the deterioration in appearance that results from the greater degree of etching of the aluminiferous metal surface. The most optimal fluoride concentration is determined by the concentration of aluminum that elutes from the metal and will therefore vary as a function of this aluminum concentration. This is due to the fact that the fluoride is required at least in part for the purpose of stabilizing, as aluminum fluoride, the aluminum eluted into the treatment bath. For example, approximately 0.2 g/L of fluorine is required per 0.1 g/L of eluted aluminum.

One type of amino-functional water-soluble polyamides used by the present invention is exemplified by condensation polyamides from dicarboxylic acid molecules (e.g., adipic acid, sebacic acid, etc.) and diamine molecules that contain a tertiary amino group in their main chains, such as N-(aminoethyl)piperazine, bis[N-(aminopropyl)piperazine], and the like, and by copolyamides of the preceding with lactams, including lactams that contain a pendant tertiary amino group, e.g., alpha-dimethylamino-epsilon-caprolactam.

A second type of polyamides, whose main chains contain polyoxyalkylene moieties, are exemplified by polyamides from dicarboxylic acid molecules (e.g., adipic acid, sebacic acid, etc.) and diamine molecules obtained from polyoxyethylene with a molecular weight of approximately 200 to 4,000, optionally also including diamines such as hexamethylenediamine, and by copolyamides of the preceding with lactams. In general, polyoxyethylene moieties are preferred over those derived from higher molecular weight epoxides than ethylene oxide.

The surface-treatment bath concentration of water-soluble polyamide molecules preferably ranges from 0.01 to 2.0 g/L and particularly preferably ranges is from 0.05 to 0.5 g/L. When the polyamide concentration falls below 0.01 g/L, coating formation is impeded and any coating formed also usually will be poorly lubricating. No additional improvements in film-forming capacity are generally obtained at polyamide concentrations beyond 2.0 g/L, and the corresponding increase in the cost of the treatment bath is therefore economically unjustified.

The pH of a surface-treatment bath according to the present invention should be from 1.8 to 4.0. The stronger etching that occurs at pH values below 1.8 makes it difficult for a coating to form, while the formation of highly corrosion-resistant coatings is hindered at pH values in excess of 4.0. These factors require that the pH be in the range of 1.8 to 4.0; the preferred pH range is 2.0 to 3.0. The pH of the surface-treatment bath can be adjusted through the use of acid, e.g., phosphoric acid, nitric acid, hydrochloric acid, hydrofluoric acid, and the like, or alkali, e.g., sodium hydroxide, sodium carbonate, ammonium hydroxide, and the like.

When treatment bath stability is substantially reduced by alloying metal ions, from alloying components such as copper, manganese, and the like, eluting from the workpiece, an at least difunctional organic acid such as gluconic acid, oxalic acid, etc. and/or other known chelating agent(s), may advantageously be added to a bath according to this invention, in order to chelate this destabilizing component.

Surface-treatment methods according to the present invention will be explained in detail in the following. While no narrow requirements apply to the treatment temperature and treatment time for the surface-treatment bath used in the invention method, treatment preferably uses the following conditions:

(i) when the surface-treatment bath is applied to the aluminiferous metal surface by spraying, preferred conditions are contact for 15 to 40 seconds at temperatures of 25° C. to 50° C., followed by water rinsing;

(ii) when the metal workpiece is immersed in the surface-treatment bath, preferred conditions are immersion for 15 to 60 seconds at 25° C. to 50° C., followed by water rinsing.

More specifically preferred embodiments of the method according to the present invention are given below.

Steps, in Order of Use, in Alternative Preferred Process #1:
1. Degreasing the metal surface (e.g., DI cans) at 40° C. to 80° C. by spraying an acidic or alkaline aqueous based or an organic solvent based degreasing composition on the surface for 25 to 60 seconds.
2. Water rinse.
3. Surface treatment, using a bath according to the present invention at 25° C. to 50° C. by spraying for 15 to 50 seconds.
4. Water rinse.
5. Rinse with deionized water
6. Drying.

Steps. in Order of Use, in Alternative Preferred Process #2:
1. Degreasing the metal surface (e.g., DI cans) at 40° C. to 80° C. by spraying an acidic or alkaline aqueous based or an organic solvent based degreasing composition for 25 to 60 seconds.
2. Water rinse.
3. Phosphate conversion coating treatment at 30° C. to 50° C. by spraying for 8 to 30 seconds.
4. Surface treatment, using a bath according to the present invention at 25 ° C. to 50° C. by spraying for 3 to 30 seconds.
5. Water rinse.
6. Rinse with deionized water
7. Drying.

Steps. in Order of Use, in Alternative Preferred Process #3:
1. Degreasing the metal surface (e.g., DI cans) at 40° C. to 80° C. by spraying an acidic or alkaline aqueous based or an organic solvent based degreasing composition for 25 to 60 seconds.
2. Water rinse.
3. Phosphate conversion coating treatment at 30° C. to 50° C. by spraying for 8 to 30 seconds.
4. Water rinse.
5. Surface treatment, using a bath according to the present invention at 25° C. to 50° C. by spraying for 3 to 30 seconds.
6. Water rinse.
7. Rinse with deionized water.
8. Drying.

As specified above, 25° C. to 50° C. is the preferred range for the treatment temperature using a surface-treatment bath according to the present invention. Low reactivity at temperatures below 25° C. can lead to failure to form a high quality coating. Most zirconium compounds in the treatment bath according to this invention become unstable at temperatures above 50° C., which leads to their partial precipitation and can lead to loss of treatment bath stability.

With regard to the treatment times given above, appropriate treatment times in the case of surface-treatment Alternative Preferred Process #1 are 15 to 50 seconds. Sufficient reaction does not reliably occur and a strongly corrosion-resistant coating may therefore not be produced at treatment times below 15 seconds. Additional increases in performance become uncertain at treatment times in excess of 50 seconds. A particularly preferred treatment time range for surface-treatment Alternative Preferred Process #1 above is 20 to 30 seconds.

Preferred treatment times for surface-treatment Alternative Preferred Processes 2 and 3 above are 3 to 30 seconds. Sufficient reaction does not reliably occur and a strongly corrosion-resistant coating may therefore not be produced at treatment times below 3 seconds. Additional increases in performance become uncertain at treatment times in excess of 30 seconds. A range of 5 to 15 seconds is the particularly preferred treatment time range for surface-treatment Alternative Processes #2 and #3 above.

The known non-chromium conversion coatings for aluminum can be used as the phosphate conversion coating in the two-reactive-treatment sequences of Processes 2 and 3 above. These are specifically exemplified by the conversion coatings described in Japanese Patent Publication Numbers Sho 52-131937 [131,937/1977], Sho 58-30344 [30,344/1983], and Sho 57-39314 [39,314/1982]. When the conversion treatment bath does not contain a component (e.g., $SO_4$ ions) that is detrimental to the effects of the present invention, treatment with a bath according to the present invention can be executed immediately after conversion treatment without an intervening water rinse, as in Alternative Preferred Process 2 above. When the conversion treatment bath does contain such a component, treatment with a bath according to the present invention is preferably carried out following a water rinse after conversion coating.

This invention will be illustrated in greater detail hereinafter through working examples, and the benefits of the invention will be illustrated by comparative examples.

GENERAL CONDITIONS FOR EXAMPLES AND COMPARISON EXAMPLES

1. Substrate metal: Aluminum DI cans

The aluminum DI cans that were surface treated as described below were fabricated by DI-processing of aluminum sheet and then cleaned with a hot aqueous solution of PALKLIN® 500 acidic degreaser, commercially supplied by Nihon Parkerizing Company, Ltd.

2. Evaluation methods (1) Corrosion resistance: Corrosion resistance of the aluminum DI cans was examined by evaluating the extent of blackening after immersion of the treated can in boiling water for 30 minutes. Absence of blackening is the desired result.

(2) Lubricity: Lubricity was evaluated based on the following test using the sliding tester depicted in FIGS. 1 (A), (B), and (C). Three of the surface-treated aluminum DI sample cans were placed on the horizontally positioned tiltable plate 1 in the sliding tester. Two of the cans, designated as 2a, were loaded with their bottom ends facing to the front. The remaining single can, designated as 2b, was loaded with its open end facing to the front.

The tiltable plate 1 was then tilted at a constant rate of 3° of angle per second by the action of the motor 3. The coefficient of static friction was calculated from the angle of inclination, determined from the time required until at least one can fell off.

(3) Paint adherence: In order to evaluate the paint adherence, the surface of the treated can was coated with an epoxy-urea can paint to a paint film thickness of 5 to 7 micrometers, then baked for 4 minutes at 215° C. Cellophane tape-peel testing was then carried out on a cross scribed in the evaluation surface using a knife cutter to determine primary adherence. The sample cans were subsequently immersed for 60 minutes in a boiling test solution with the composition given below, after which cellophane tape-peel testing was again carried out to determine secondary adherence. The adherence was evaluated as the presence/absence of paint film peeling.

Test solution (simulated juice)

5 g/L of sodium chloride
5 g/L of citric acid
Balance: deionized water

SPECIFIC EXAMPLES

Example 1

The surfaces of cleaned aluminum DI cans were subjected to the following treatment steps in the sequence given: spraying for 20 seconds with ALODINE® 404 zirconium phosphate based conversion coating bath for aluminum DI can applications heated to 35° C. (commercially supplied by Nihon Parkerizing Company, Ltd.); spraying for 10 seconds with Surface-treatment Bath 1 having the composition shown below and heated to 35° C.; rinsing with tap water; spraying for 10 seconds with deionized water with a specific resistivity of at least 3,000,000 ohm-cm; and drying for 2 minutes at 200° C. in a hot-air drying oven. The corrosion resistance and paint adherence of the resulting DI can were then evaluated. (Note: In all the descriptions of the surface treatment baths below, "ppm"=parts per million by weight and the value shown for fluorine ["F"] is the total fluorine from both fluozirconic acid and hydrofluoric acids when both are present.)

| Surface-treatment Bath 1 | | | |
|---|---|---|---|
| 75% phosphoric acid ($H_3PO_4$) | 138 | ppm | ($PO_4$: 100 ppm) |
| 20% fluozirconic acid ($H_2ZrF_6$) | 1137 | ppm | (Zr: 100 ppm) |
| 20% hydrofluoric acid (HF) | 235 | ppm | (F: 170 ppm) |
| water-soluble polyamide #1 | 250 | ppm | | pH: 2.5 (adjusted with nitric acid or aqueous ammonia)

The remainder of the Bath was water. Water-soluble polyamide #1 was a terpolymer of adipic acid, N-(aminoethyl)piperazine, and caprolactam.

Example 2

Cleaned aluminum DI cans were subjected to the following treatments in the sequence given: spraying for 25 seconds with the same surface-treatment as was used in the first step in Example 1; immersion for 15 seconds in Surface-treatment Bath 2 having the composition shown below and heated to 30° C.; a water rinse and 10-second spray with de-ionized water as in Example 1; and drying for 2 minutes at 200° C. in a hot-air drying oven, The corrosion resistance and paint adherence of the resulting DI cans were then evaluated.

| Surface-treatment Bath 2 | | | |
|---|---|---|---|
| 75% phosphoric acid ($H_3PO_4$) | 206 | ppm | ($PO_4$: 150 ppm) |
| 20% fluozirconic acid ($H_2ZrF_6$) | 455 | ppm | (Zr: 40 ppm) |
| 20% hydofluoric acid (HF) | 210 | ppm | (F: 90 ppm) |
| water-soluble polyamide #1 | 150 | ppm | | pH: 3.0 (adjusted with nitric acid or aqueous ammonia)

The remainder of the Bath was water.

Example 3

The cleaned aluminum DI cans were subjected to the following treatments in the sequence given: spraying for 20 seconds with the same surface-treatment as was used in the first step in Example 1; spraying for 5 seconds with Surface-treatment Bath (3) having the composition shown below and heated to 45° C.; and a water rinse, de-ionized water rinse, and drying as in Example 1. The corrosion resistance and paint adherence of the resulting DI cans were then evaluated.

| Surface-treatment Bath 3 | | | |
|---|---|---|---|
| 75% phosphoric acid ($H_3PO_4$) | 413 | ppm | ($PO_4$: 300 ppm) |
| 20% fluotitanic acid ($H_2TiF_6$) | 683 | ppm | (Ti: 40 ppm) |
| 20% hydrofluoric acid (HF) | 262 | ppm | (F: 100 ppm) |
| water-soluble polyamide #2 | 200 | ppm | | pH: 2.5 (adjusted with nitric acid or aqueous ammonia)

The balance of the Bath was water. Water-soluble polyamide #2 is a terpolymer of adipic acid; an amine terminated polyoxyethylene with the general formula $H_2N-(C_2H_4O)_n-NH_2$, where n represents a positive integer with a value such that the polyoxyethylene block represented by $(C_2H_4O)_n$ has a molecular weight in the range from about 200 to 4,000; and caprolactam.

Example 4

The cleaned aluminum DI cans were subjected to the following treatments in the sequence given: spraying for 20 seconds with the same surface-treatment as was used in the first step in Example 1; immersion for 30 seconds in Surface-treatment Bath 4 having the composition shown below and heated to 50° C.; and a water rinse, deionized water rinse, and drying as in Example 1. The corrosion resistance and paint adherence of the resulting DI cans were then evaluated.

| Surface-treatment Bath 4 | | | |
|---|---|---|---|
| 75% phosphoric acid ($H_3PO_4$) | 138 | ppm | ($PO_4$: 100 ppm) |
| 20% fluozirconic acid ($H_2ZrF_6$) | 1137 | ppm | (Zr: 100 ppm) |
| 20% hydrofluoric acid (HF) | 235 | ppm | (F: 170 ppm) |
| water-soluble polyamide #2 | 100 | ppm | | pH: 2.8 (adjusted with nitric acid or aqueous ammonia)
The balance of the Bath was water.

Example 5

The cleaned aluminum DI cans were subjected to the following treatments in the sequence given: spraying for 20 seconds with the same surface-treatment as in the first step of Example 1; spraying for 8 seconds with Surface-treatment Bath 5 having the composition shown below and heated to 35° C.; and a water rinse, deionized water rinse, and drying as in Example 1. The corrosion resistance and paint adherence of the resulting DI cans were then evaluated.

| Surface-treatment Bath (5) | | | |
|---|---|---|---|
| 75% phosphoric acid ($H_3PO_4$) | 138 | ppm | ($PO_4$: 100 ppm) |
| 20% fluozirconic acid ($H_2ZrF_6$) | 1137 | ppm | (Zr: 100 ppm) |
| 20% hydrofluoric acid (HF) | 235 | ppm | (F: 170 ppm) |
| water-soluble polyamide #3 | 100 | ppm | | pH: 2.5 (adjusted with nitric acid or aqueous ammonia)
The balance of the Bath was water. Water-soluble polyamide #3 was a block terpolymer of blocks of (i) polycaprolactam, (ii) a copolymer of adipic acid and N-(aminoethyl)piperazine, and (iii) a copolymer of adipic acid and an amine terminated polyoxyethylene with the general formula $H_2N-(C_2H_4O)n-NH_2$, where n represents a positive integer with a value such that the polyoxyethylene block represented by $(C_2H_4O)_n$, has a molecular weight in the range from about 200 to 4,000.

Example 6

The cleaned aluminum DI cans were subjected to the following treatments in the sequence given: spraying for 30 seconds with PALCOAT®3753 surface-treatment, for aluminum DI cans, commercially supplied by Nihon Parkerizing Company, Ltd. and heated to 50° C.; rinsing with water; spraying for 15 seconds with Surface-treatment Bath 6 having the composition shown below and heated to 35° C.; and a water rinse, deionized water rinse, and drying as in Example 1. The corrosion resistance and paint adherence of the resulting DI cans were then evaluated.

| Surface-treatment Bath 6 | | | |
|---|---|---|---|
| 75% phosphoric acid ($H_3PO_4$) | 412 | ppm | ($PO_4$: 300 ppm) |
| 20% fluotitanic acid ($H_2TiF_6$) | 683 | ppm | (Ti: 40 ppm) |
| 20% fluozirconic acid ($H_2ZrF_6$) | 455 | ppm | (Zr: 40 ppm) |
| 20% hydrofluoric acid (HF) | 157 | ppm | (F: 80 ppm) |
| water-soluble polyamide #3 | 100 | ppm | | pH: 3.0 (adjusted with nitric acid or aqueous ammonia)
The balance of the Bath was water.

Example 7

The cleaned aluminum DI cans were sprayed for 30 seconds with Surface-treatment Bath 7 having the composition shown below and heated to 25° C., followed by a water rinse, de-ionized water rinse, and drying as in Example 1. The corrosion resistance and paint adherence of the resulting DI cans were then evaluated.

| Surface-treatment Bath 7 | | | |
|---|---|---|---|
| 75% phosphoric acid ($H_3PO_4$) | 69 | ppm | ($PO_4$: 50 ppm) |
| 20% fluozirconic acid ($H_2ZrF_6$) | 455 | ppm | (Zr: 40 ppm) |
| 20% hydrofluoric acid (HF) | 25 | ppm | (F: 55 ppm) |
| water-soluble polyamide #3 | 50 | ppm | | pH: 3.0 (adjusted with nitric acid or aqueous ammonia)
The balance of the Bath was water.

Example 8

The cleaned aluminum DI cans were immersed for 35 seconds in Surface-treatment Bath 8 having the composition shown below and heated to 40° C., followed by a water rinse, deionized water rinse, and drying as in Example 1. The corrosion resistance and paint adherence of the resulting DI cans were then evaluated.

| Surface-treatment Bath 8 | | | |
|---|---|---|---|
| 75% phosphoric acid ($H_3PO_4$) | 110 | ppm | ($PO_4$: 80 ppm) |
| 20% fluotitanic acid ($H_2TiF_6$) | 854 | ppm | (Ti: 50 ppm) |
| 20% hydrofluoric acid (HF) | 10 | ppm | (F: 65 ppm) |
| water-soluble polyamide #2 | 100 | ppm | | pH: 3.0 (adjusted with nitric acid or aqueous ammonia)
The balance of the Bath was water.

Comparative Example 1

The cleaned aluminum DI cans were sprayed for 25 seconds with the same surface-treatment as in the first step of Example 1, followed by a water rinse, deionized water rinse, and drying as in Example 1. The corrosion resistance and paint adherence of the resulting DI cans were then evaluated.

Comparative Example 2

The cleaned aluminum DI cans were subjected to the following treatments in the sequence given: spraying for 20 seconds with the same surface-treatment as in the first step of Example 1; spraying for 10 seconds with Surface-treatment Bath 9 having the composition shown below and heated to 35° C.; and a water rinse, deionized water rinse, and drying as in Example 1. The corrosion resistance and paint adherence of the resulting DI cans were then evaluated.

| Surface-treatment Bath 9 | | | |
|---|---|---|---|
| 75% phosphoric acid ($H_3PO_4$) | 138 | ppm | ($PO_4$: 100 ppm) |
| 20% fluozirconic acid ($H_2ZrF_6$) | 500 | ppm | (Zr: 44 ppm) |
| 20% hydrofluoric acid (HF) | 210 | ppm | (F: 95 ppm) | pH: 3.0 (adjusted with nitric acid or aqueous ammonia)
The balance of the Bath was water.

Comparative Example 3

The cleaned aluminum DI cans were subjected to the following treatments in the sequence given: spraying for 25 seconds with the same surface-treatment as in the first step of Example 1; spraying for 20 seconds with Surface-treatment Bath 10 having the composition shown below and heated to 35° C.; and a water rinse, deionized water rinse, and drying as in Example 1. The corrosion resistance and paint adherence of the resulting DI cans were then evaluated.

Surface-treatment Bath 10

| | | | |
|---|---|---|---|
| 75% phosphoric acid ($H_3PO_4$) | 138 | ppm | ($PO_4$: 100 ppm) |
| 20% hydrofluoric acid (HF) | 210 | ppm | (F: 40 ppm) |
| water-soluble polyamide #3 | 100 | ppm | | pH: 3.0 (adjusted with nitric acid or aqueous ammonia)
The balance of the Bath was water.

Comparative Example 4

The cleaned aluminum DI cans were subjected to the following treatments in the sequence given: spraying for 25 seconds with the same surface-treatment as in the first step of Example 1; spraying for 15 seconds with Surface-treatment Bath 11 having the composition shown below and heated to 35° C.; and a water rinse, deionized water rinse, and drying as in Example 1. The corrosion resistance and paint adherence of the resulting DI cans were then evaluated.

Surface-treatment Bath 11

| | | | |
|---|---|---|---|
| 20% fluozirconic acid ($H_2ZrF_6$) | 500 | ppm | (Zr: 44 ppm) |
| 20% hydrofluoric acid (HF) | 26 | ppm | (F: 60 ppm) |
| water-soluble polyamide #3 | 100 | ppm | | pH: 4.5 (adjusted with nitric acid or aqueous ammonia)
The balance of the Bath was water.

Comparative Example 5

The cleaned aluminum DI cans were sprayed for 20 seconds with Surface-treatment Bath 12 having the composition shown below and heated to 35° C., followed by a water rinse, deionized water rinse, and drying as in Example 1. The corrosion resistance and paint adherence of the resulting DI cans were then evaluated.

Surface-treatment Bath 12

| | | | |
|---|---|---|---|
| 75% phosphoric acid ($H_3PO_4$) | 138 | ppm | ($PO_4$: 100 ppm) |
| 20% fluozirconic acid ($H_2ZrF_6$) | 500 | ppm | (Zr: 44 ppm) |
| 20% hydrofluoric acid (HF) | 236 | ppm | (F: 100 ppm) |
| water-soluble polyamide #3 | 100 | ppm | | pH: 4.5 (adjusted with nitric acid or aqueous ammonia)
The balance of the Bath was water.

The test results from Examples 1 to 8 and Comparative Examples 1 to 5 are reported in Table 1. In Examples 1 to 8, the surfaces of aluminiferous metal were treated with a surface-treatment bath according to the present invention by the surface-treatment method according to the present invention. As the corresponding results in Table 1 make clear, an excellent corrosion resistance, excellent paint adherence, and excellent lubricity were obtained in all cases. In contrast to this, a poor lubrication performance in particular was obtained for the products in Comparative Examples 1 to 5, which used surface-treatment baths outside the scope of the invention. Application of the surface-treatment bath according to the present invention to aluminum DI cans provides the surface of

TABLE 1

| | | | Paint Adhesion[3] | |
|---|---|---|---|---|
| Identification | RtBbBW[1] | Lubricity[2] | Primary | Secondary |
| Example 1 | ++ | ++ | no peeling | no peeling |
| Example 2 | ++ | ++ | no peeling | no peeling |
| Example 3 | ++ | ++ | no peeling | no peeling |
| Example 4 | ++ | ++ | no peeling | no peeling |
| Example 5 | ++ | ++ | no peeling | no peeling |
| Example 6 | ++ | ++ | no peeling | no peeling |
| Example 7 | ++ | ++ | no peeling | no peeling |
| Example 8 | ++ | ++ | no peeling | no peeling |
| Comparative Example 1 | ++ | x | no peeling | no peeling |
| Comparative Example 2 | ++ | x | no peeling | no peeling |
| Comparative Example 3 | ++ | + | no peeling | no peeling |
| Comparative Example 4 | ++ | x | no peeling | no peeling |
| Comparative Example 5 | x | + | no peeling | no peeling |

Footnotes for Table 1
[1]"RtBbBW" = "Resistance to Blackening by Boiling Water" and was reported on the following scale:
x: entire surface blackened
+: partial blackening
++: complete absence of blackening.
[2]Lubricity was evaluated on the following scale:
x: coefficient of static friction greater than 1.3
+: coefficient of static friction of 0.9 to 1.3
++: coefficient of static friction below 0.9.
[3]Paint Adherence, both primary and secondary, was evaluated by the presence or absence of any detected paint film peeling.

aluminum DI cans with an excellent corrosion resistance and lubricity prior to the painting or printing thereof. This makes possible the highly desirable effect of supporting an acceleration of the manufacturing line.

The invention claimed is:

1. An aqueous liquid composition for treating the surface of aluminiferous metals with or without dilution with water, said aqueous liquid composition comprising:
   (A) phosphate ions;
   (B) a component selected from water-soluble zirconium and titanium compounds, in an amount such that the ratio by weight of the stoichiometric equivalent as total zirconium and titanium metal to the weight of phosphate ions in the composition is from 0.01 to 50;
   (C) a component selected from simple and complex fluoride anions, in an amount such that the ratio by weight of the stoichiometric equivalent as total fluorine to the weight of phosphate ions in the composition is from 0.01 to 200; and
   (D) a component selected from polyamides that include moieties selected from the group consisting of tertiary amino moieties and polyoxyalkylene moieties, in an amount such that the ratio by weight of the polyamides to the weight of phosphate ions in the composition is from 0.01 to 200.

2. A working composition according to claim 1 which has a pH value in the range from 1.8 to 4.0 and comprises water and:
   (A) from 0.01 to 1.0 g/L of phosphate ions;
   (B) from 0.01 to 0.5 g/L, measured as its total stoichiometric equivalent as zirconium and/or titanium metal, of a component selected from the group consisting of water-soluble zirconium and titanium compounds;
   (C) from 0.01 to 2.0 g/L, measured as its stoichiometric equivalent as fluorine, of a component selected from the group consisting of simple and complex fluoride anions; and (D) from 0.01 to 2.0 g/L of a component selected from the group consisting of water-soluble polyamide molecules, each of which contains at least one moiety selected from the group consisting of tertiary amine moieties and polyoxyalkylene moieties.

3. A composition according to claim 2, wherein the pH value is from 2.0 to 3.0.

4. A composition according to claim 3, wherein the concentration of component (A) is from 0.02 to 0.40 g/L.

5. A composition according to claim 4, wherein the concentration of component (B) is from 0.02 to 0.08 g/L.

6. A composition to claim 5, wherein the concentration of component (C) is from 0.03 to 0.6 g/L.

7. A composition according to claim 6, wherein the concentration of component (D) is from 0.05 to 0.5 g/L.

8. A process for treating an aluminiferous metal surface to form a coating thereon, comprising a step of contacting the aluminiferous metal surface with a composition according to claim 7 at a temperature in the range from 25 to 50° C. and satisfying one of th following sets of conditions: (i) spraying for 20 to 30 seconds when the surface being treated has not been previously phosphate conversion coated; or (ii) spraying for 5 to 15 seconds when the surface being treated has been previously phosphate conversion coated.

9. A process for treating an aluminiferous metal surface to form a coating thereon, comprising a stop of contacting the aluminiferous metal surface with a composition according to claim 6 at a temperature in the range from 25 to 50° C. and satisfying one of the following sets of conditions: (i) spraying for 20 to 30 seconds when the surface being treated has not been previously phosphate conversion coated: (ii) spraying for 5 to 15 seconds when the surface being treated has been previously phosphate conversion coated; or (iii) immersion for 15 to 60 seconds.

10. A process for treating an aluminiferous metal surface to form a coating thereon, comprising a stop of contacting the aluminiferous metal surface with a composition according to claim 5 at a temperature in the range from 25 to 50° C. and satisfying one of the following sets of conditions: (i) spraying for 15 to 40 seconds when the surface being treated has not been previously phosphate conversion coated; (ii) spraying for 3 to 30 seconds when the surface being treated has been previously phosphate conversion coated; or (iii) immersion for 15 to 60 seconds.

11. A process for treating an aluminiferous metal surface to form a coating thereon, comprising a stop of contacting the aluminiferous metal surface with a compostion according to claim 4 at a temperature in the range from 25 to 50° C. and satisfying one of the following sets of conditions: (i) spraying for 15 to 40 seconds when the surface being treated has not been previously phosphate conversion coated; (ii) spraying for 3 to 30 seconds when the surface being treated has been previously phosphate conversion coated; or (iii) immersion for 15 to 60 seconds.

12. A process for treating an aluminiferous metal surface to form a coating thereon, comprising a step of contacting the alumlnlferous metal surface with a composition according to claim 3 at a temperature in the range from 25 to 50° C. and satisfying one of the following sets of conditions: (i) spraying for 15 to 40 seconds when the surface being treated has not been previously phosphate conversion coated; (ii) spraying for 3 to 30 seconds when the surface being treated has been previously phosphate conversion coated; or (ii) immersion for 15 to 60 seconds.

13. A process for treating an aluminiferous metal surface to form a coating thereon, comprising a step of contacting the aluminiferous metal surface with a composition according to claim 2 t a temperature in the range from 25 to 50° C.

* * * * *